Dec. 29, 1936.    S. E. PIHL    2,065,908
COVER AND LIKE FASTENER INSTALLATION AND FASTENER FOR THE SAME
Filed Jan. 15, 1935
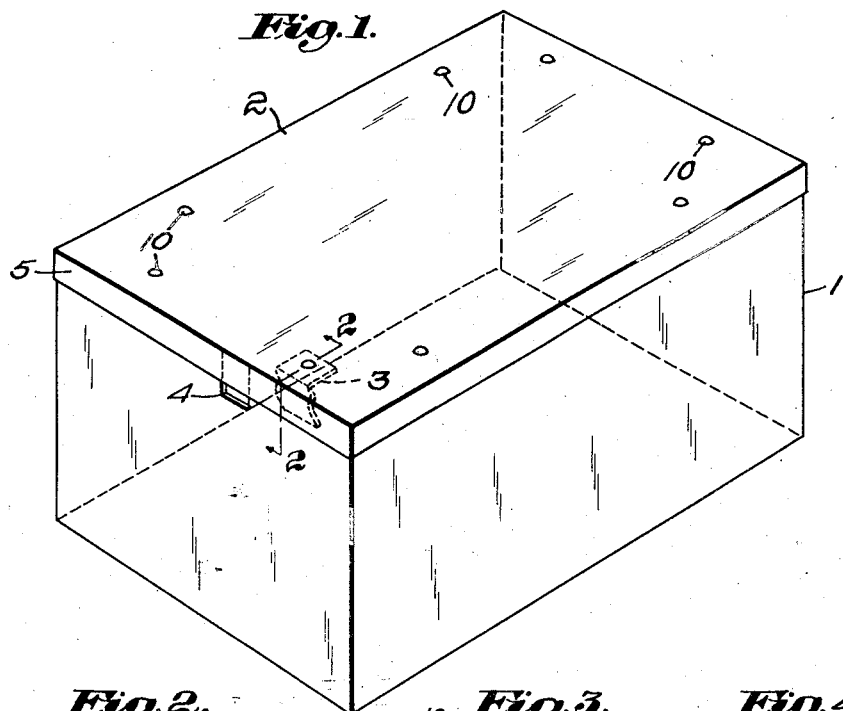
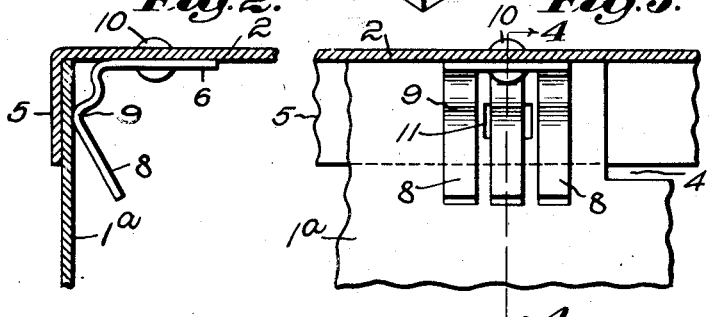
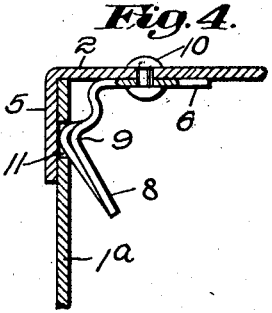
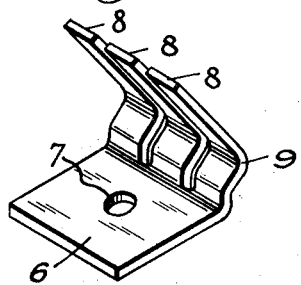
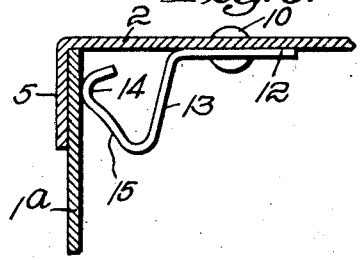
Inventor:
Sophus E. Pihl
by Walter S. Jones
Att'y Patented Dec. 29, 1936

2,065,908

UNITED STATES PATENT OFFICE 2,065,908

COVER AND LIKE FASTENER INSTALLATION AND FASTENER FOR THE SAME

Sophus E. Pihl, Dorchester, Mass., assignor to United-Carr Fastener Corporation, Cambridge, Mass., a corporation of Massachusetts Application January 15, 1935, Serial No. 1,911

5 Claims. (Cl. 220—55)

My invention aims to provide improvements in fasteners for the covers of boxes, cabinets, cases and the like structures.

In the drawing, which illustrates preferred forms of my invention:—

Figure 1 is a perspective view of a box and cover employing one form of fastener;

Fig. 2 is an enlarged section taken on the line 2—2 of Fig. 1;

Fig. 3 is an enlarged view from inside the box, showing the fastener and the adjacent parts of the box and cover;

Fig. 4 is a sectional view of the installation taken on the line 4—4 of Fig. 3, the fastener being shown in elevation;

Fig. 5 is a perspective view of one form of the fastener per se; and

Fig. 6 is a sectional view of an installation as shown in Fig. 1, including another form of fastener.

One object of my invention is to provide fastening means for box-covers and the like which will enable the cover to be quickly and securely attached to the box without the use of tools.

Other objects of my invention are to provide fastening means which cannot become lost or shaken loose; and to provide fastening means which will insure a good electrical contact between the cover and the box, as is necessary in such installations as the metal cabinet of an automobile radio.

Referring now to the drawing, I have shown in Fig. 1 a box or cabinet unit 1, a cover 2, and a fastener member 3. While I have shown only one fastener, it is to be understood that as many fasteners are to be used as is necessary to insure a secure installation. In one wall of the box there may be provided a slot 4 which extends below the edge of the flange 5 of the cover 2, to allow the insertion of a screw-driver or other tool to aid in removing the cover from the box when desired.

The fastener itself may take several forms, one of which I have shown in Fig. 5. This particular type of fastener is formed preferably from flat spring metal and has a flat attaching portion 6, provided with an aperture 7; and a number of spring fingers 8. These fingers provide shoulders 9, formed by bending the material of the fastener in a reverse curve, so that the shoulders are spaced from the plane of the flat portion 6 and extend beyond the end thereof. The free ends of the fingers are substantially straight (Fig. 5) and form less than a 90° angle with the attaching portion.

A number of these fasteners are secured to the inside of the cover by rivets 10 (or other fastening means) with the shoulders 9 facing toward and bearing against the flange 5. When the cover is placed in position on the box and forced down, the wall 1a of the box engages the fingers 8, which are slanted inwardly (Fig. 2), and forces the shoulders 9 away from the flange. When the cover is completely closed, the shoulders force the wall 1a against the flange 5 and the cover is thus secured in place. The fingers 8 provide a strong spring action; and being separately movable they will compensate for any error in alignment due to incorrect placing of the fasteners on the cover.

If it is desired to have an even more secure assembly, means (such as a detent 11) may be formed in the wall of the box opposite one of the fingers of each fastener (Figs. 3 and 4). Thus, when the cover is in the closed position, one shoulder of each fastener will enter the detent 11 and the other shoulders will bear against the adjacent portions of the wall.

When it becomes necessary to open the box, a tool may be inserted in the aperture provided by the slot 4 (Fig. 3) to aid in starting the cover from its closed position.

I have shown in Fig. 6 an alternative form of fastener to be used in the same manner as the one described above. This fastener is also formed from sheet metal and has an attaching portion 12, fingers 13 provided with wall-engaging shoulders 14, and a curved cam surface 15. This fastener makes the positioning of the cover on the box somewhat easier because of the greater scope of its cam surface 15 and the additional ability to yield.

From the above description it will be apparent that my improved fastening means provides a very secure assembly adaptable to any installation of this type.

While I have illustrated and described preferred forms of my invention, I do not wish to be limited thereby, as the scope of my invention is best defined by the following claims.

I claim:

1. In combination, a metal automobile radio box having upstanding walls, one of said walls having a detent formed in the material thereof spaced from its upper edge; a cover for said box, a sheet metal fastener member secured to said cover and having a plurality of spaced-apart spring fingers, each of said fingers having an outwardly disposed shoulder, one of said shoulders engaging the detent in the wall of the box and other shoulders bearing against the wall of the box adjacent to said detent whereby said cover is secured to said box.

2. The combination with a metal automobile radio box and the like structure having straight side walls of a cover for said box having rigid flanges disposed outside said walls, a plurality of individual fastener members secured to said cover, each of said fasteners having an integral spring member bearing outwardly against the wall of said box and cooperating with the flange at the opposite side thereof to hold said wall in a spring grip, and at least one of said walls having an aperture extending below the edge of the flange corresponding thereto to permit the insertion of a tool for aiding in the removal of said cover.

3. The combination with an automobile radio box and the like having straight rigid side walls of a cover for said box having rigid flanges disposed outside said side walls and in engagement with said walls, said cover having means associated therewith for the purpose of detachably securing said cover to said box, said means comprising a plurality of sheet metal fastener members secured to the under side of said cover within the periphery thereof, each of said fasteners having an outwardly disposed integral spring member adapted to bear against the inside of a wall of the box, and said fasteners being so arranged on the cover that when said cover is placed on the box the spring portion of each fastener will be compressed toward the interior of the box, all the fasteners thereby cooperating to hold the cover in position.

4. A fastener member for installations of the class described formed from sheet metal and having a substantially flat attaching portion providing means for securing the fastener to a supporting structure, and a plurality of independent yieldable projections extending from said attaching portion and arranged in a straight line for engaging a flat wall of an automobile radio box, each of said projections providing a shoulder spaced from the plane of said attaching portion and movable relative thereto for the purpose described.

5. A fastener member for installations of the class described formed from sheet metal and having a substantially flat attaching portion providing means for securing the fastener to a supporting structure and a plurality of independently yieldable fingers extending in angular relation from said attaching portion and arranged in a straight line for engaging a flat wall of an automobile radio box for the purposes described.

SOPHUS E. PIHL.